(12) United States Patent
Yun

(10) Patent No.: US 12,012,355 B2
(45) Date of Patent: Jun. 18, 2024

(54) GLASS SUBSTRATE MULTILAYER STRUCTURE, MANUFACTURING METHOD THEREOF, AND FLEXIBLE DISPLAY PANEL INCLUDING THE SAME

(71) Applicants: SK Innovation Co., Ltd., Seoul (KR); SK ie technology Co., Ltd., Seoul (KR)

(72) Inventor: Cheol Min Yun, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 17 days.

(21) Appl. No.: 17/741,861

(22) Filed: May 11, 2022

(65) Prior Publication Data

US 2022/0388899 A1 Dec. 8, 2022

(30) Foreign Application Priority Data

May 25, 2021 (KR) .......................... 10-2021-0066650

(51) Int. Cl.
*C03C 17/34* (2006.01)
*G02B 1/14* (2015.01)

(52) U.S. Cl.
CPC ............ *C03C 17/3405* (2013.01); *G02B 1/14* (2015.01); *C03C 2217/78* (2013.01)

(58) Field of Classification Search
CPC ......... B32B 17/10; B32B 27/281; G02B 1/14; C09D 179/08–179/085; C09D 133/08–133/12; G06F 1/1652
See application file for complete search history.

(56) References Cited

U.S. PATENT DOCUMENTS

| 2016/0075830 A1* | 3/2016 | Fukukawa | .................. C08J 5/18 428/458 |
| 2020/0292731 A1 | 9/2020 | Park et al. | |
| 2021/0246265 A1 | 8/2021 | Lee et al. | |

FOREIGN PATENT DOCUMENTS

| KR | 100489727 B1 | 5/2005 | |
| KR | 102068685 B1 | 1/2020 | |
| KR | 1020200078142 A | 7/2020 | |
| KR | 1020200087704 A | 7/2020 | |
| WO | WO-2020096757 A1 * | 5/2020 | ............. B32B 17/10 |
| WO | WO-2020145674 A1 * | 7/2020 | ................ C08F 2/50 |

* cited by examiner

*Primary Examiner* — Prashant J Khatri
(74) *Attorney, Agent, or Firm* — The Webb Law Firm

(57) ABSTRACT

Provided herein are glass substrate multilayer structure, a manufacturing method thereof, and a flexible display panel including the same. Also provided is a glass substrate multilayer structure that has remarkably good surface hardness, has remarkably good impact resistance, can provide for safety of a user by resisting scattering when the glass substrate is broken, and has excellent optical properties. The disclosure also relates to a manufacturing method the glass substrate multilayer structure, and a flexible display panel including the same.

18 Claims, 1 Drawing Sheet

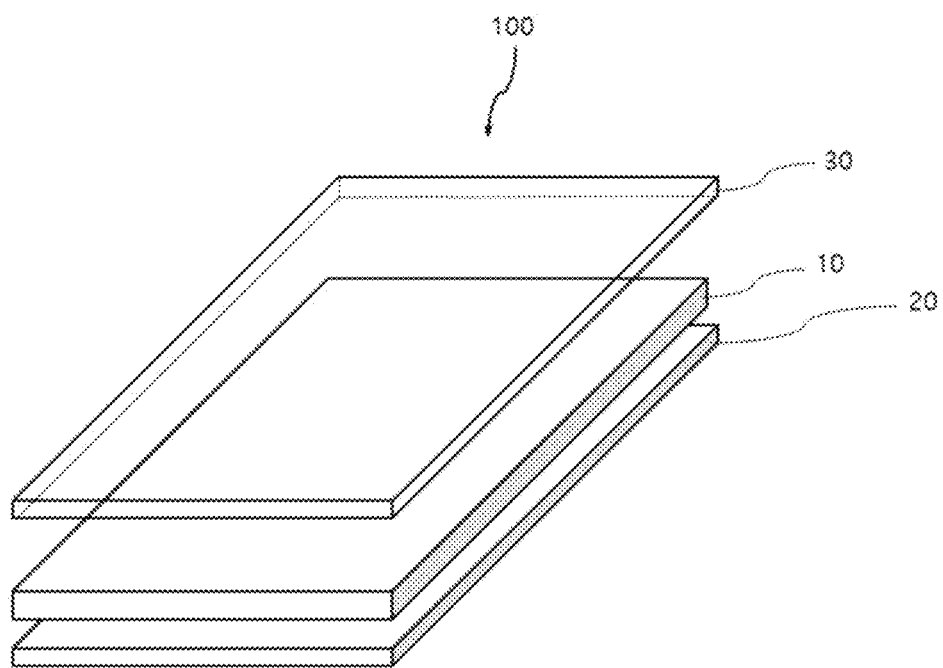

GLASS SUBSTRATE MULTILAYER STRUCTURE, MANUFACTURING METHOD THEREOF, AND FLEXIBLE DISPLAY PANEL INCLUDING THE SAME

CROSS-REFERENCE TO RELATED APPLICATION

This application claims priority to Korean Patent Application No. 10-2021-0066650 filed May 25, 2021, the disclosure of which is hereby incorporated by reference in its entirety.

BACKGROUND OF THE INVENTION

Field of the Invention

The following disclosure relates to a glass substrate multilayer structure, a manufacturing method thereof, and a flexible display panel including the same.

Description of Related Art

Recently, with the development of mobile devices such as smartphones and tablet PCs, it is desirable to reduce the thickness of a display device. In particular, a flexible display device that may be bent or folded whenever users want or a flexible display device may have a bending or folding step during a manufacturing process is attracting attention.

Such a display device can comprise a transparent window covering a display screen, and the window functions to protect the display device from external impacts, scratches applied during use, and the like.

Glass or tempered glass, which is a material with excellent mechanical properties, is generally used as a display window, but conventional glass has the problems of no flexibility, and increasing the weight of the display device due to the weight of the glass.

In order to solve the above problems, a technology for thinning a flexible glass substrate has been developed, but it is still not sufficient to realize flexible properties that may be permit the glass to be bent or folded, and it still does not solve the problem of being easily damaged by external impact.

In particular, in the case of the flexible display device, there is a problem in that the glass substrate window is easily broken due to an external impact or during the bending or folding. Further fragments of the glass substrate window may be scattered, and thus may injure users. Efforts have been made to solve the problem by forming an anti-scattering layer, which is designed with a flexible structure, on a flexible glass thin film.

However, forming the anti-scattering layer (hereinafter, also referred to as shatter proof layer), may generate marks on the glass substrate itself or on a surface hardness layer on the glass substrate by pressing. Further, physical properties of a glass multilayer structure itself such as surface hardness are decreased.

Accordingly, there is a need to provide a new glass multilayer structure that dramatically improves the problem of decreasing the surface hardness or marking the device during pressing or when a pen drops, even if an anti-scattering layer includes a soft polymer. In addition, there is a need to develop a new glass substrate multilayer structure that has improved impact resistance, and may provide for safety of users by mitigating the scattering phenomenon when a glass substrate is broken, and has excellent optical properties.

The description provided in this section is for the purposes of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

SUMMARY OF THE INVENTION

In one embodiment, provided herein is a glass substrate multilayer structure that does not show a decrease in surface hardness or does not generate marks during pressing or when a pen drop test is performed.

In another embodiment, provided herein is a glass substrate multilayer structure that, in the case of using a thin glass substrate as a substrate, even if the glass substrate multilayer structure has a structure including an anti-scattering layer formed on one surface of a glass substrate and a hard coating layer formed on the other surface opposite to the one surface, prevents a surface hardness of the glass substrate and/or the hard coating layer. In one embodiment, the glass substrate and/or the hard coating layer resist being damaged during pressing. In certain embodiments, the glass substrate multilayer structure has improved impact resistance, can provide for the safety of a user by mitigating the scattering phenomenon when the glass substrate is broken, and has excellent optical properties, and thus, can be used in a flexible display device.

In another embodiment, provided herein is a glass substrate multilayer structure having excellent surface properties that do not generate pen marks on a surface of a glass substrate or a surface of a hard coating layer when a pen drop test is performed at a designated position (height) even if the glass substrate multilayer structure has a structure including an anti-scattering layer formed on one surface of a glass substrate and a hard coating layer formed on the other surface opposite to the one surface.

In another embodiment, provided herein is a glass substrate multilayer structure having durability, scattering resistance and flexible properties, and wherein breakage or cracks of glass does not occur even when a folding or bending operation is performed or repeated, and thus, can be usable in a flexible display device.

In another embodiment, the glass substrate multilayer structure provided herein has desirable optical properties such as yellowness (YI), light transmittance, and thickness direction retardation $R_{th}$, and has improved visibility and transparency, and thus, is usable in a flexible display device.

In one embodiment, the anti-scattering layer is a polyimide layer comprising a polyfunctional (meth)acrylic crosslinked polymer.

In one embodiment, the glass substrate multilayer structure comprises a flexible glass substrate; and an anti-scattering layer formed on one surface of the flexible glass substrate, and the anti-scattering layer includes a polyfunctional (meth)acrylic crosslinked polymer and a polyimide polymer.

In certain embodiments, the glass substrate multilayer structure further comprises a hard coating layer formed on the other surface of the flexible glass substrate.

In certain embodiments, the polyfunctional (meth)acrylic crosslinked polymer comprises an alkylene group, an ether group, a urethane group, an ester group, or a combination thereof.

In certain embodiments, the polyfunctional (meth)acrylic crosslinked polymer comprises a structural unit derived from a polyfunctional (meth)acrylic compound having 3 to 6 (meth)acrylic groups.

In certain embodiments, the polyfunctional (meth)acrylic compound comprises trimethylolpropane tri(meth)acrylate, trimethylolethane tri(meth)acrylate, 1,2,4-cyclohexanetri(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra (meth) acrylate, dipentaerythritol hexa(meth)acrylate, tripentaerythritol tri(meth)acrylate, tripentaerythritol hexa (meth)acrylate, polyfunctional urethane (meth)acrylate, polyfunctional polyester(meth)acrylate, or a combination thereof.

In certain embodiments, the polyimide polymer comprises a unit derived from a fluorine-containing aromatic diamine and a unit derived from an aromatic dianhydride.

In certain embodiments, the hard coating layer comprises a (meth)acrylic hard coating layer.

In certain embodiments, the flexible glass substrate may have a thickness of about 1 to 100 μm.

In certain embodiments, the anti-scattering layer may have a thickness of about 1 to 20 μm.

In certain embodiments, the hard coating layer may have a thickness of about 1 to 15 μm.

In certain embodiments, the glass substrate multilayer structure may have a pencil hardness of 4 H or more, or more specifically, a pencil hardness of 4 H to 9 H according to ASTM D3363.

In certain embodiments, the glass substrate multilayer structure may have an impact resistance when the pen drop test is performed at a height of about 10 cm or more.

In another aspect, provided herein are methods of manufacturing a glass substrate multilayer structure comprising: forming an anti-scattering layer by applying and curing an anti-scattering composition comprising a polyimide precursor and a polyfunctional (meth)acrylic compound on one surface of a flexible glass substrate.

In certain embodiments, the method of manufacturing a glass substrate multilayer structure may further comprise: forming a hard coating layer by applying and curing a hard coating composition on the other surface of the flexible glass substrate.

In certain embodiments, the polyfunctional (meth)acrylic compound may further comprise an alkylene group, an ether group, a urethane group, an ester group, or a combination thereof.

In certain embodiments, the polyfunctional (meth)acrylic compound may comprise 3 to 6 (meth)acrylic groups.

In certain embodiments, the polyfunctional (meth)acrylic compound may comprise trimethylolpropane tri(meth)acrylate, trimethylolethane tri(meth)acrylate, 1,2,4-cyclohexanetri(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra (meth) acrylate, dipentaerythritol hexa(meth)acrylate, tripentaerythritol tri(meth)acrylate, tripentaerythritol hexa (meth)acrylate, polyfunctional urethane (meth)acrylate, polyfunctional polyester(meth)acrylate, or a combination thereof.

In certain embodiments, the polyimide precursor may comprise a unit derived from a fluorine-containing aromatic diamine and a unit derived from an aromatic dianhydride.

In certain embodiments, the hard coating composition may comprise a polyfunctional (meth)acrylic compound.

In one embodiments, provided herein is a flexible display panel comprising the glass substrate multilayer structure in accordance with any of the aspects or embodiments described above.

BRIEF DESCRIPTION OF THE DRAWING

FIG. 1 is an exploded perspective view schematically illustrating an example of a cross section of a glass substrate multilayer structure as part of an article of manufacture according to an embodiment of the present disclosure. The illustrative glass substrate multilayer structure 100 as shown comprises a flexible glass substrate 10, an anti-scattering layer 20, and a hard coating layer 30.

DESCRIPTION OF THE INVENTION

Hereinafter, a glass substrate multilayer structure, a manufacturing method thereof, and a flexible display panel including the same according to certain embodiments will be described in detail.

In this case, unless otherwise defined, all technical and scientific terms have the same meaning as commonly understood by one of ordinary skill in the art to which this disclosure pertains. The terms used in the description herein are for the purpose of effectively describing particular embodiments only and are not intended to limit the scope of this disclosure.

In addition, the unit of additives not specifically described in the specification may be parts by weight.

Also, the singular forms used in the specification and appended claims are intended to include the plural forms as well, unless the context specifically dictates otherwise.

Throughout the specification, when a certain part "includes" a certain component, it may mean that it may further include other components rather than excluding other components unless otherwise specified.

Hereinafter, unless there is a special definition in the present specification, when a part of a layer, film, thin film, region, plate, and the like is "above" or "on" another part, this may include not only a case where it is "just above" another part, but also a case where there is another part in between.

Hereinafter, unless otherwise specified in the present specification, the term "combination thereof" may mean mixing or copolymerization of constituents. The term "combination thereof" may also mean that any two or more of identified elements preceding the term may be used or provided together.

Hereinafter, unless otherwise specified in the present specification, "A and/or B" may mean an aspect including A and B at the same time, and may mean an aspect selected from A and B.

Hereinafter, unless otherwise specified herein, "derived" may mean that the resulting structure or composition was produced from a reaction including the compound. In some cases, at least one of the functional groups of the compound is modified, and specifically may include a form in which the reactive group and/or the leaving group of the compound are modified or left according to the reaction. In addition, when structures derived from different compounds are identical to each other, structures derived from any one compound may include cases having the same structure derived from any other compound.

Hereinafter, unless otherwise specified in the present specification, the term "polymer" refers to a molecule of high relative molecular mass, the structure of which comprises multiple repetition of units derived from molecules of low molecular mass. In certain embodiments, the polymer of the present technology is a copolymer (e.g., includes more than one kind of monomer) to include a block copolymer, random copolymer, branched copolymer, crosslinked copolymer, or combination thereof. In other embodiments, the polymer is a homopolymer (e.g., includes one kind of monomer).

Hereinafter, unless otherwise specified in the present specification, the term "oligomer" refers to a molecule comprising a few or identical repeating units derived from molecules of low molecular weight. In contrast to polymers, oligomers comprise a fewer number of monomeric units (e.g., less than 30 monomeric units) whereas polymers are macromolecules comprising a larger number of monomeric units (e.g., greater than 30 monomeric units). In certain embodiments, the oligomer may comprise 2 to 20 monomeric units.

Hereinafter, unless otherwise specified in the present specification, the term "flexible" may mean that a flexible element is capable of curling, bending, and/or folding.

Hereinafter, unless otherwise specified in the present specification, the term "hard coating layer" may include a "(meth)acrylic hard coating layer".

Hereinafter, unless otherwise specified in the present specification, "(meth)acryl" may be used in a way that means either or both "methacryl" and "acryl".

Hereinafter, unless otherwise specified in the present specification, "polyimide" is a polymer including an imide structure, and may be understood in a way that means "polyimide" or "polyamideimide".

Hereinafter, unless otherwise specified in the present specification, "(meth)acrylic crosslinked polymer" may mean a crosslinked polymer formed by crosslinking (meth)acrylic compounds having (meth)acrylic groups with each other, and the (meth)acrylic crosslinked polymer may or may not include a (meth)acrylic group, for example, a (meth)acrylate group.

Hereinafter, unless otherwise specified in the present specification, the term "about" contemplates a value within 30%, 25%, 20%, 15%, 10%, or 5% of the specified value.

According to one embodiment, provided herein is a glass substrate multilayer structure that maintains surface hardness and does not generate marks during pressing or a pen drop, even if the structure comprises a soft polymer.

FIG. 1 shows an example of a glass multilayer structure based on the disclosed technology to prevent surface hardness from decreasing and reduce generation of material structural changes or marks during pressing or external impacts with or without including a soft polymer layer. The structure in this example in FIG. 1 includes a flexible glass substrate 10, an anti-scattering layer 20 engaged to one side (e.g., the lower side) of the flexible glass substrate 10, and a hard coating layer 30 engaged to the other side (e.g., the upper side) of the flexible glass substrate 10. Therefore, the glass multilayer structure 100 in FIG. 1 places the flexible glass substrate 10 between the anti-scattering layer 20 and the hard coating layer 30.

One embodiment, in the case of using a thin glass substrate as a substrate, even if the glass substrate multilayer structure comprises an anti-scattering layer made of a soft polymer formed on one surface of a glass substrate and a hard coating layer formed on the other surface opposite to the one surface, provided herein is a glass substrate multilayer structure that maintains surface hardness and/or is free from structural change or marks due pressing or folding, and can be used in a flexible display device.

The present embodiments will be described in detail as follows.

In one embodiments, provided herein is a glass substrate comprising: a flexible glass substrate; and
an anti-scattering layer formed on one surface of the flexible glass substrate, in which the anti-scattering layer comprises a polyfunctional (meth)acrylic crosslinked polymer and a polyimide polymer.

In a further embodiment, provided herein is a glass substrate comprising: a flexible glass substrate;
an anti-scattering layer formed on one surface of the flexible glass substrate; and
a hard coating layer formed on the other (e.g., opposite) surface of the flexible glass substrate, in which the anti-scattering layer comprises a multifunctional (meth)acrylic crosslinked polymer and a polyimide polymer.

In one embodiment, the glass substrate multilayer structure comprises an anti-scattering layer, in particular, an anti-scattering layer comprising a polyfunctional (meth)acrylic crosslinked polymer and a polyimide polymer on one surface of a flexible glass substrate. Without being limited by theory, the glass substrate multilayer structure comprising an anti-scattering layer is thought to provide flexible properties (e.g., good flexibility), prevent a decrease in surface hardness and a increase impact resistance as measured using a pen drop test (which are in a trade-off relationship with the flexible properties), provided desirable optical properties, and as a result, the glass substrate multilayer structure may be suitable for use as a cover window of a flexible display panel.

In certain embodiments, the polyfunctional (meth)acrylic crosslinked polymer may be formed by inducing crosslinking polymerization of a polyfunctional (meth)acrylic compound through means such as heating, and the crosslinking polymerization may be one in which all or part of the polyfunctional (meth)acrylic compound is crosslinked, but is not necessarily limited thereto. The polyfunctional (meth) acrylic compound is a compound having a polyfunctional (meth)acrylic group, and the (meth)acrylic group may be, for example, an acrylic group or a methacrylic group.

In certain embodiments, the multifunctional (meth)acrylic crosslinked polymer may be dispersed in a polyimide matrix resin of the anti-scattering layer to form a composite. However, a bond between the polyfunctional (meth)acrylic crosslinked polymer and the polyimide polymer may not include a chemical bond, and for example, the polyfunctional (meth)acrylic crosslinked polymer and the polyimide polymer may not be covalently bonded to each other.

In certain embodiments, the polyfunctional (meth)acrylic crosslinked polymer may further comprises an alkylene group, an ether group, a urethane group, an ester group, or a combination thereof, but is not necessarily limited thereto.

In certain embodiments, the polyfunctional (meth)acrylic crosslinked polymer may include a structural unit derived from a polyfunctional (meth)acrylic compound having 3 to 6, for example 4 to 6, or for example 5 or 6 (meth)acrylic groups, but is not necessarily limited thereto. Here, the (meth)acrylic group may be, for example, an acrylic group or a methacrylic group.

In certain embodiments, the polyfunctional (meth)acrylic crosslinked polymer may comprises a structural unit derived from a polyfunctional (meth)acrylic compound such as a monomer having a polyfunctional (meth)acrylic group and an oligomer having a polyfunctional (meth)acrylic group, but is not necessarily limited thereto.

In certain embodiments, the anti-scattering layer comprises a polyfunctional (meth)acrylic crosslinked polymer and polyimide polymer satisfying the above-described properties. As a result, without being limited by theory, the glass substrate multilayer structure provided herein may provide flexible properties, prevent a decrease in surface hardness and a increase impact resistance as measured using a pen drop test. Normally, flexible properties are in a trade-off relationship with surface hardness and impact resistance. A glass substrate multilayer structure in accordance with embodiments herein may additionally provide desirable optical properties, and thus, may be further suitable for use as a cover window of a flexible display panel.

In certain embodiments, the glass substrate multilayer structure provided herein may have a pencil hardness of about 4 H or more, specifically about 4 H to about 9 H, and more specifically about 5 H to about 6 H according to the pencil hardness standard ASTM D3363, but is not necessarily limited thereto.

In certain embodiments, the glass substrate multilayer structure provided herein may have an impact resistance when the pen drop test is performed at a height of about 10 cm or more, for example, about 15 cm or more, and for example, about 20 cm or more, and for example about 10 cm to about 25 cm, and for example about 10 cm to about 20 cm, but is not necessarily limited thereto. In this case, the impact resistance by the pen drop test means a state without surface dents and pressing when a ballpoint pen having a diameter of about 0.7 mm and a weight of about 0.5 g is vertically dropped from a designated position (height) above the glass substrate multilayer structure.

Without being limited by theory, it is thought that by having the surface hardness and impact resistance properties within the above range, the glass substrate multilayer structure provided herein will possess flexibility and maintain the original hardness, impact resistance and durability of the glass substrate.

In certain embodiments, the glass substrate multilayer structure provided herein may have a bending value of within about ±0.4 mm, for example, within about ±0.3 mm, and for example, within about ±0.25 mm, but is not necessarily limited thereto. In this case, the bending property is determined by measuring the bending of the glass substrate multilayer structure at the room temperature after placing the glass substrate multilayer structure on a vibration isolation table. In this case, when the substrate is bent in a direction of the vibration isolation table and a center of the glass substrate is bent to an air layer, a step difference from an uppermost bend point of the center is measured based on an edge and represented by a negative (stress) value (mm), and conversely, when both ends (edges) of the glass substrate are bent in the direction of the air layer on the vibration isolation table, a step difference of the raised edge is measured based on the center and represented by a positive (tensile) value (mm).

Without being limited by theory, it is thought by having the bending property in the above range, the glass substrate multilayer structure provided herein will possess flexible properties that allow it to be folded or bent, so that the breakage or cracks of glass may not likely occur even when the folding or bending operation is repeated, and as a result, can be more appropriately used in the flexible display device.

In certain embodiments, the glass substrate multilayer structure provided herein may have a degree of yellowness (YI) under ASTM Method E313 in various ranges, including, for example, of about 0.1 to about 5.0, for example, about 0.1 to about 3.0, or for example, about 0.1 to about 2.0, measured according to ASTM E313, and have b* value of about 0.1 to about 2.0, for example, about 0.1 to about 1.5, or for example, about 0.1 to about 1.0, but is not necessarily limited thereto.

In certain embodiments, the glass substrate multilayer structure provided herein may have a total light transmittance of about 85 to about 99.9% and for example, about 90 to about 99.9%, measured at 400 to 700 nm according to ASTM D1746, but is not necessarily limited thereto.

In certain embodiments, The glass substrate multilayer structure exhibits some degree of optical birefringence and therefore, it is desirable to measure the amount of the retardation between light in two orthogonal polarizations in the glass substrate multilayer structure in order to compensate for the retardation between the two orthogonal polarizations of light. This can be achieved by cutting the glass substrate multilayer to a certain size and using Axoscan to measure the thickness of the film in order to determine the retardation with Axoscan polarimeter. The retardation is the delay between the light in the two orthogonal polarizations that correspond to the two orthogonal polarization states where light passes through the material at the highest and lowest refractive indices, respectively, and can be expressed in phase (degrees) or distance. The retardation value by measuring the retardation with Axoscan, the retardation ($R_{th}$) measured while correcting in the C-plate direction may be about 10 to about 40 μm, or for example, about 10 to about 30 μm, but is not necessarily limited thereto. For example, the retardation ($R_{th}$) (at 550 nm) may be calculated through Equation 1 below.

$$R_{th}=[(n_x+n_y)/2-n_z] \times d \qquad \text{[Equation 1]}$$

(In Equation 1, $n_x$ denotes the largest refractive index among in-plane refractive indices, $n_y$ denotes a refractive index perpendicular to $n_x$ among in-plane refractive indices, $n_z$ denotes a perpendicular refractive index, and d is calculated by converting the thickness of the glass substrate multilayer structure into 10 μm, i.e., using 10 μm as the unit.)

Without being limited by theory, it is thought that by having the optical properties in the above range, the glass substrate multilayer structure provided herein has desirable properties such as visibility, transparency, and the like, and can be more suitably used in a flexible display device.

Hereinafter, referring to FIG. 1, each configuration of the flexible glass substrate 10, the anti-scattering layer 20, and the hard coating layer 30 included in the glass substrate multilayer structure 100 according to an embodiment of the present invention will be described in more detail. However, this is merely exemplary, and the present disclosure is not limited to the specific embodiments described by way of example.

<Flexible Glass Substrate>

First, a flexible glass substrate according to an aspect of the present invention will be described.

In one embodiment, a flexible glass substrate means a foldable or curved glass substrate, and function as a window of a display device, and has good durability, and has excellent surface smoothness, and transparency.

In one embodiment, the flexible glass substrate bent by pressure or force has excellent restoration properties that restore its original shape after the pressure or force is removed.

In certain embodiments, the glass substrate multilayer structure 100 may be formed on one surface of the flexible display panel, and may be bent or folded in response to bending or folding. In this case, in order for the glass substrate multilayer structure 100 to be deformed enough to be bent or folded with a relatively small radius of curvature, the flexible glass substrate 10 may be formed of an ultra-thin glass substrate.

In certain embodiments of the glass substrate multilayer structure 100, the flexible glass substrate 10 may be an ultra-thin glass substrate, and the thickness thereof may be about 100 μm or less, specifically about 1 to about 100 μm, and more specifically, may be about 30 to about 100 μm, but is not necessarily limited thereto.

In certain embodiments of the glass substrate multilayer structure 100, the flexible glass substrate 10 may further comprises a chemically strengthened layer, in which the chemically strengthened layer may be formed by performing a chemical strengthening treatment on one or more of a first surface or a second surface of the flexible glass substrate 10, and as a result, the strength of the flexible glass substrate 10 will be further improved.

It should be noted that there are various methods of forming the ultra-thin flexible glass substrate that has been subjected to the chemical strengthening treatment as described above; for example, ultra-thin glass (UTG) having a thickness of about 100 μm or less may be prepared and subjected to cutting, chamfered, fired, and the like to be processed into a predetermined shape, and then, may be subjected to the chemical strengthening treatment, and as another example, a general thickness of glass may be prepared and subjected to a slimming operation to be a thickness of about 100 μm or less, and then, may be sequentially subjected to shape processing and/or chemical strengthening treatment, but this is only a non-limiting example, and is not necessarily limited thereto. In this case, the slimming operation may be performed by using any one or two methods selected from a mechanical method and/or a chemical method, but is not necessarily limited thereto.

<Anti-Scattering Layer>

Next, an anti-scattering layer according to an aspect of the present invention will be described.

In certain embodiments, the anti-scattering layer 20 may improve a basic function of absorbing energy generated when the flexible glass substrate 10 is damaged to prevent fragments from scattering. In addition, as a non-limiting aspect of the embodiments provided herein, the anti-scattering layer 20 may be formed on the other surface opposite to the direction in which the hard coating layer is formed, thereby to further improve the decrease in surface hardness and further improve the impact resistance.

In certain embodiments of the glass substrate multilayer structure 100, the anti-scattering layer 20 may comprise various suitable materials, e.g., a polyfunctional (meth) acrylic crosslinked polymer and a polyimide polymer.

In certain embodiments of the glass substrate multilayer structure 100, the polyfunctional (meth)acrylic crosslinked polymer may be formed via crosslink polymerization of a polyfunctional (meth)acrylic compound through means such as heating, and the crosslinking polymerization may be one in which all or part of the polyfunctional (meth)acrylic compound is crosslinked, but is not necessarily limited thereto. In certain embodiments, the polyfunctional (meth) acrylic compound is a compound having a polyfunctional (meth) acrylic group, and the (meth) acrylic group may be, for example, an acrylic group or a methacrylic group.

In certain embodiments, the multifunctional (meth) acrylic crosslinked polymer may be dispersed in a polyimide matrix resin of the anti-scattering layer to form a composite. In certain embodiments, a bond between the polyfunctional (meth) acrylic crosslinked polymer and the polyimide polymer may not include a chemical bond, and for example, the polyfunctional (meth) acrylic crosslinked polymer and the polyimide polymer may not be covalently bonded to each other.

In certain embodiments of the glass substrate multilayer structure 100, the polyfunctional (meth)acrylic crosslinked polymer may further comprises an alkylene group, an ether group, a urethane group, an ester group, or a combination thereof, but is not necessarily limited thereto.

In certain embodiments, in the glass substrate multilayer structure provided herein, the polyfunctional (meth)acrylic crosslinked polymer may comprise a structural unit derived from a polyfunctional (meth)acrylic compound having 3 to 6, for example, 4 to 6, or for example, 5 or 6 (meth)acrylic groups, but is not necessarily limited thereto. Here, the (meth) acrylic group may be, for example, an acrylic group or a methacrylic group.

In certain embodiments, the polyfunctional (meth)acrylic crosslinked polymer may comprise a structural unit derived from a polyfunctional (meth)acrylic compound such as a monomer having a polyfunctional (meth)acrylic group and an oligomer having a polyfunctional (meth)acrylic group, but is not necessarily limited thereto. In the glass substrate multilayer structure 100 according to an aspect of the present invention, the polyfunctional (meth)acrylic compound may include trimethylolpropane tri(meth)acrylate, trimethylolethane tri(meth)acrylate, 1,2,4-cyclohexanetri (meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta (meth)acrylate, dipentaerythritol tetra (meth)acrylate, dipentaerythritol hexa(meth)acrylate, tripentaerythritol tri(meth) acrylate, tripentaerythritol hexa (meth)acrylate, polyfunctional urethane (meth)acrylate, polyfunctional polyester (meth)acrylate, or a combination thereof. For example, the polyfunctional (meth) acrylic compound may include dipentaerythritol hexa (meth) acrylate, pentaerythritol tetra (meth) acrylate, polyfunctional urethane (meth) acrylate, polyfunctional polyester (meth) acrylate, or any combination thereof, but is not necessarily limited thereto.

In certain embodiments of the glass substrate multilayer structure 100 provided herein, the polyfunctional urethane (meth) acrylate can be prepared by reacting (meth) acrylate comprising a hydroxyl group and a compound comprising an isocyanate group in the presence of a catalyst. An example of the commercialized polyfunctional urethane (meth) acrylate may include urethane acrylate (PU9020, Miwon Special Chemical), but this is only one non-limiting example, but is not necessarily limited thereto.

In this case, examples of the (meth)acrylate compound comprising a hydroxyl group comprises 2-hydroxyethyl (meth)acrylate, 2-hydroxyisopropyl (meth)acrylate, 4-hydroxybutyl (meth)acrylate, caprolactone ring-opened hydroxy acrylate, or pentaerythritol tri/tetra (meth)acrylate, dipentaerythritol penta/hexa (meth)acrylate, or any combination thereof, but the examples are not necessarily limited thereto.

Further, examples of the compound having an isocyanate group may comprises 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)

cyclohexane, trans-1,4-cyclohexenediisocyanate, 4,4'-methylenebis(cyclohexylisocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenylisocyanate), 4,4'-oxybis (phenylisocyanate), trifunctional isocyanates derived from hexamethylene diisocyanate, any combination of the foregoing, and the like, but the examples are not necessarily limited thereto.

In addition, in certain embodiments of the glass substrate multilayer structure 100, the polyfunctional polyester (meth) acrylate is prepared by reacting a polyester polyol and acrylic acid according to a method known in the art. A commercialized example may include polyester acrylate (PS2500, Miwon Special Chemical), but this is only a non-limiting example, and is not necessarily limited thereto.

In this case, examples of the polyfunctional polyester (meth) acrylate may include polyester diacrylate, polyester tetraacrylate, polyester hexaacrylate, polyester pentaerythritol triacrylate, polyester pentaerythritol tetraacrylate, polyester pentaerythritol hexaacrylate, or a combination thereof, and the like, but is not necessarily limited thereto.

In certain embodiments of the glass substrate multilayer structure 100, the polyimide polymer may comprises a unit derived from a fluorine-containing aromatic diamine and a unit derived from an aromatic dianhydride. Without being limited by theory, it is thought that this will provide desirable optical properties and the mechanical properties, desirable elasticity and restoring forces and enhanced prevention of the deformation of the glass substrate, but the present invention is not limited thereto.

In certain embodiments of the glass substrate multilayer structure 100, the fluorine-containing aromatic diamine may be 1,4-bis(4-amino-2-trifluoromethylphenoxy)benzene (6FAPB), 2,2'-bis(trifluoromethyl)-benzidine (2,2'-bis(trifluoromethyl)-benzidine (TFMB), 2,2'-bis(trifluoromethyl)-4,4'-diaminodiphenyl ether (6FODA), or the like, or a mixture of two or more thereof, but is not necessarily limited thereto. In addition, the fluorine-containing aromatic diamine may be used in combination with other known aromatic diamine components, which may or may not contain fluorine, but is not necessarily limited thereto.

In certain embodiments of the glass substrate multilayer structure 100, the aromatic dianhydride may include any one selected from 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylideenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylric dianhydride (PMDA), benzophenone tetracarboxylicric dianhydride (BTDA), bis (carboxyphenyl) dimethyl silane dianhydride (SiDA), bis (dicarboxyphenoxy) diphenyl sulfide dianhydride (BDSDA), and ethylene glycol bis (anhydrotrimellitate) (TMEG100), and the like, or a mixture of two or more thereof, but is not necessarily limited thereto.

In certain embodiments of the glass substrate multilayer structure 100, without being limited by theory, it is thought that by forming the anti-scattering layer 20 may be on a rear surface of the flexible glass substrate 10, solve the problem in that the glass substrate may be easily broken by external impact or during bending or folding, and the fragments may be scattered, and at the same time, by including the multifunctional (meth)acrylic crosslinked polymer in the anti-scattering layer 20, it is possible to maintain the surface hardness, the impact resistance, and the durability, which are in a trade-off relationship with flexible properties.

In certain embodiments, the anti-scattering layer 20 comprising the polyfunctional (meth) acrylic crosslinked polymer can be formed on both sides of the flexible glass substrate 10 together with the hard coating layer 30, in particular, the hard coating layer formed by curing the compound having a (meth) acrylic group, thereby further improving the resistance to dents by the pen drop test and the impact resistance.

In certain embodiments of the glass substrate multilayer structure 100, the thickness of the anti-scattering layer 20 is not particularly limited, but may be about 1 to about 20 μm, specifically about 2 to about 10 μm, and more specifically about 5 to about 10 μm, but is not necessarily limited thereto.

<Hard Coating Layer>

Next, the hard coating layer according to an aspect of the present invention will be described.

Without being limited by theory, the hard coating layer 30 may function to protect the glass substrate multilayer structure 100 from external physical and chemical damage, and may have excellent optical and mechanical properties.

In certain embodiments, the hard coating layer 30 may be formed on the other surface (for example, the opposite surface) of the flexible glass substrate 10 on which the anti-scattering layer 20 is formed. For example, the surface of the flexible glass substrate 10 may be subjected to the chemical strengthening treatment, and the hard coating layer 30 may be formed on the surface of the flexible glass substrate 10 subjected to the chemical strengthening treatment.

In addition, in certain embodiments of the glass substrate multilayer structure 100, the hard coating layer 30 may be designed to have, for example, the same properties as the shrinkage phenomenon of the anti-scattering layer 20 formed on the rear surface of the flexible glass substrate 10, and more specifically, may be a (meth) acrylic hard coating layer, but is not necessarily limited thereto.

In addition, in certain embodiments of the glass substrate multilayer structure 100, the thickness of the hard coating layer 30 may be about 1 to about 15 μm, for example, about 1 to about 10 μm, and for example, about 1 to about 5 μm, but is not necessarily limited thereto. When having a thickness in the above range, the hard coating layer 30 is preferable because it can maintain very good hardness and flexibility.

In certain embodiments of the glass substrate multilayer structure 100, the hard coating layer 30 may further comprise inorganic particles, in which the inorganic particles may be any one selected from silica, metal oxide, and the like, or a combination of two or more thereof, but is not necessarily limited thereto.

In addition, the inorganic particles may further comprise particles selected from hydroxides such as aluminum hydroxide, magnesium hydroxide, potassium hydroxide; metal particles such as gold, silver, copper, nickel, and alloys thereof; conductive particles such as carbon, carbon nanotube, and fullerene; glass; ceramic; and the like, but is not necessarily limited thereto.

In certain embodiments, the inorganic particles may have an average particle diameter of about 1 to about 200 nm, specifically about 10 to about 200 nm, and within the average particle diameter range, inorganic particles having two or more different average particle diameters may be used, but is not necessarily limited thereto. By including the inorganic particles as described above, the surface hardness of the hard coating layer 30 may be further improved.

<Flexible Display Panel>

In certain embodiments, provided herein is a flexible display panel or a flexible display device comprising the glass substrate multilayer structure 100 as shown in the example in FIG. 1 and as disclosed in this patent document.

For example, in the flexible display device, the glass substrate multilayer structure 100 may be used as an outermost window substrate of the flexible display panel. The flexible display device may be any of various image display devices such as a typical liquid crystal display device, an electroluminescence display device, a plasma display device, and a field emission display device, but is not necessarily limited thereto.

<Method of Manufacturing Glass Substrate Multilayer Structure>

Hereinafter, a method of manufacturing a glass substrate multilayer structure 100 will be described in detail.

In certain embodiments, methods of manufacturing a glass substrate multilayer structure 100 may comprise forming an anti-scattering layer 20 by applying and curing an anti-scattering composition comprising one or more polyimide precursor(s) and one or more polyfunctional (meth) acrylic compound(s) on one surface of a flexible glass substrate.

In certain embodiments, the methods of manufacturing a glass substrate multilayer structure 100 may comprise a step of forming an anti-scattering layer 20 by applying and curing an anti-scattering composition comprising a polyimide precursor and a polyfunctional (meth)acrylic compound on one surface of a flexible glass substrate; and the step of forming a hard coating layer 30 by applying and curing a hard coating composition to the other surface of the flexible glass substrate.

First, in the methods of manufacturing a glass substrate multilayer structure 100, the anti-scattering composition for forming the anti-scattering layer 20 will be described.

In certain embodiments, the anti-scattering composition is a composition comprising the one or more polyimide precursors and the one or more polyfunctional (meth) acrylic compounds. In this case, the polyimide precursor(s) included in the anti-scattering composition may comprise a unit derived from a fluorine-containing aromatic diamine and a unit derived from an aromatic dianhydride, and the fluorine-containing aromatic diamine and aromatic dianhydride may be the same as those described above in the description of the anti-scattering layer 20.

In certain embodiments, the polyfunctional (meth)acrylic compound may further comprises an alkylene group, an ether group, a urethane group, an ester group, or a combination thereof, but is not limited thereto.

In certain embodiments, in the method of manufacturing a glass substrate multilayer structure 100, at least one of the one or more polyfunctional (meth)acrylic compound comprises 3 to 6, for example, 4 to 6, or for example, or 6 (meth)acrylic groups, but is not necessarily limited thereto. Here, the (meth) acrylic group may be, for example, an acrylic group or a methacrylic group.

In certain embodiments, the polyfunctional (meth) acrylic compound may comprise a monomer having a polyfunctional (meth) acrylic group, an oligomer having a polyfunctional (meth) acrylic group, or the like, and may use the same compound as described above in the description of the anti-scattering layer 20.

In the methods of manufacturing a glass substrate multilayer structure 100, the polyfunctional (meth) acrylic compound may be a compound included in an amount of about 1 to about 50 parts by weight, specifically about 10 to about 40 parts by weight, or more specifically, about 20 to about 40 parts by weight based on a total of about 100 parts by weight of the one or more polyimide precursor and the polyfunctional (meth) acrylic compounds, but is not necessarily limited thereto.

When the content of the polyfunctional (meth)acrylic compound satisfies the above range, it is possible to further improve the surface hardness, the resistance deformation by impact (e.g., as measured by the pen drop test), and/or the surface condition, such as durability due to impact properties The polyimide precursor can be prepared by dissolving a fluorine-containing aromatic diamine in an organic solvent, adding an aromatic dianhydride to a mixed solution, and polymerizing the mixture. In this case, the polymerization reaction may be carried out under an inert gas or nitrogen stream, and may be carried out under anhydrous conditions. In addition, the polymerization reaction temperature may be carried out at about −20 to 200° C., or specifically about 0 to 180° C., but is not necessarily limited thereto. In addition, an organic solvent that may be used in the polymerization reaction may be N,N-diethylacetamide (DEAc), N,N-diethylformamide (DEF), N-ethylpyrrolidone (NEP), dimethylpropionamide (DMPA), diethylpropanamide (DEPA), or the like, or a mixture of two or more thereof, but is not necessarily limited thereto.

In some embodiments, the polyimide precursor(s) may be present in the form of a polyimide precursor solution. In some embodiments, the polyimide precursors solution comprises polyimide precursor dissolved in one or more organic solvents (e.g., two, three, or four organic solvents). In some embodiments, the polyimide precursor is present in an organic solvent and to that solution, a second organic solvent is added to dilute the polyimide precursor. In some embodiments, the polyimide precursor is added to an organic solvent as a solid power, in which the polyimide precursor is dissolved upon mixing with the organic solvent to form the polyimide precursor solution.

In certain embodiments, the anti-scattering composition may be prepared by adding the one or more polyfunctional (meth) acrylic compound to the polyimide precursor solution.

In certain embodiments of the method of manufacturing a glass substrate multilayer structure 100, the addition of the one or more polyfunctional (meth)acrylic compounds may be performed by, for example, a method of adding the polyfunctional (meth)acrylic compound(s) diluted in a solvent to the polyimide precursor solution, followed by stirring at room temperature.

In certain embodiments, crosslinking and/or imidization may be induced through heating during the stirring. In this case, the solubility of the anti-scattering composition in the solvent may be increased during the crosslinking reaction, the reaction conditions are not limited as long as the crosslinked polymer may be uniformly dispersed in the solution, and the heating temperature may be about 50 to about 200° C., but is not necessarily limited thereto.

The solvent diluting the polyfunctional (meth) acrylic compound may be N,N-diethylacetamide (DEAc), N,N-diethylformamide (DEF), N-ethylpyrrolidone (NEP), dimethylpropionamide (DMPA), diethylpropanamide (DEPA), or the like, or a mixture of two or more thereof, but is not necessarily limited thereto.

In certain embodiments of the methods of manufacturing a glass substrate multilayer structure 100, a known imidization method may be used without limitation in the imidization process, but specific examples include a chemical imidization method, a thermal imidization method, and the like. In certain embodiments, an azeotropic thermal imidization method or a chemical imidization method can be used, but the present invention is not necessarily limited thereto.

The azeotropic thermal imidization method may be, for example, a method of adding toluene or xylene to the polyimide precursor solution including the polyfunctional (meth) acrylic compound, stirring the mixture, and performing an imidization reaction of the mixture at about 160 to about 200° C. for about 6 to about 24 hours, and water released while an imide ring is formed may be separated as an azeotrope of toluene or xylene, but the present invention is not necessarily limited thereto.

In certain embodiments of the method of manufacturing a glass substrate multilayer structure 100, the polyfunctional (meth) acrylic compound in the anti-scattering composition may be further crosslinked at a temperature at which the imidization reaction is performed.

Hereinafter, methods of forming the anti-scattering layer 20 will be described.

In certain embodiments of the method of manufacturing a glass substrate multilayer structure 100, the anti-scattering layer 20 may be formed by applying and curing the anti-scattering composition to one surface of the flexible glass substrate 10. In this case, the coating method may be bar coating, dip coating, die coating, gravure coating, comma coating, or slit coating or a mixing method thereof, but is not necessarily limited thereto.

In certain embodiments, the curing comprises heat treatment at a temperature of about 50 to about 250° C., in which the number of times of the heat treatment may be once or more, and the curing may be to perform heat treatment once or more at the same temperature or different temperature ranges, but this is only one non-limiting example, and is not necessarily limited thereto. In addition, the heat treatment time may be about 1 minute to about 60 minutes, but is not necessarily limited thereto.

When the heat treatment is performed as described above, the crosslinking of the polyfunctional (meth)acrylic compound in the anti-scattering composition may proceed without a separate initiator, and the stability at room temperature may also be improved because the anti-scattering composition does not include the initiator, and when the polyfunctional (meth)acrylic compound exists in a partially crosslinked state in the anti-scattering composition, the isotropy of the composition may be further improved.

Next, in the methods of manufacturing a glass substrate multilayer structure 100, methods of manufacturing the hard coating composition for forming the hard coating layer 30 will be described.

In certain embodiments, the hard coating layer 30 may be prepared including a known hard coating composition. In this case, the hard coating composition has the same shrinkage characteristics as the polyfunctional (meth) acrylic crosslinked polymer of the anti-scattering layer, and may be prepared by curing the composition including the polyfunctional (meth) acrylic compound, but is not necessarily limited thereto.

In certain embodiments, the method of manufacturing a glass substrate multilayer structure 100 can be implemented to comprise coating and curing the anti-scattering layer made of the soft polymer formed on one surface of the glass, and thus, the multilayer structure is bent, resulting in a problem in that the bending properties, or the durability may decreased. In this case, when the hard coating layer is formed by applying and curing a hard coating composition including a (meth)acrylic material having the same or similar shrinkage characteristics as or to the multifunctional (meth)acrylic crosslinked polymer of the anti-scattering layer on the other surface opposite to the surface on which the anti-scattering layer is formed, the bend phenomenon caused by the anti-scattering layer is more remarkably offset, and as a result, the glass substrate multilayer structure 100 having more excellent bending properties and durability may be obtained.

In certain embodiments of the methods of manufacturing a glass substrate multilayer structure 100, when the hard coating layer 30 is prepared by curing a composition including a polyfunctional (meth)acrylic compound, the hard coating layer 30 may be manufactured through a photocuring or thermosetting process after the application of the hard coating composition, but is not limited thereto.

In certain embodiments of the methods of manufacturing a glass substrate multilayer structure 100, the hard coating composition may further comprise a photoinitiator or a thermal initiator.

In certain embodiments, the photoinitiator may comprise an onium salt and/or an organometallic salt or the like as a photocationic initiator. Specific examples include a diaryliodonium salt, a triarylsulfonium salt, an aryldiazonium salt, and an iron-arene complex, and any combination of two or more thereof, but this is only a non-limiting example, and is not necessarily limited thereto.

The content of the photoinitiator is not particularly limited, and may include, for example, about 0.01 to about 10 parts by weight, specifically about 0.1 to about 10 parts by weight, and more specifically about 0.5 to about 5 parts by weight based on about 100 parts by weight of the hard coating composition. Without being limited by theory, it is thought that when the content of the photoinitiator is within the above range, the curing efficiency of the hard coating composition may be maintained more excellently, and the decrease in the physical properties due to residual components after the curing may be further prevented.

As the thermal initiator, a cationic thermal initiator may be used, and the thermal initiator may be included in an amount of about 0.01 to about 15 parts by weight, specifically about 0.1 to about 15 parts by weight, and more specifically about 0.3 to about 10 parts by weight based on about 100 parts by weight of the hard coating composition, but is not necessarily limited thereto. Without being limited by theory, it is thought that when the content of the thermal initiator is within the any one of above range, the thermosetting reaction may proceed at a more effective rate, and the beneficial mechanical properties of the hard coating layer 30 may be maintained due to the content of other components of the hard coating composition may be further prevented from decreasing.

In certain embodiments of the methods of manufacturing a glass substrate multilayer structure 100, the hard coating composition may further comprise a crosslinking agent. The crosslinking agent may solidify the hard coating composition and further improve the hardness of the hard coating layer 30. Examples of suitable crosslinking agents include diamines (which may promote condensation reactions with carbonyl groups of the (meth) acrylate compounds), polyvinyl compounds, small-molecule cross-linking (e.g., formaldehyde, glutaraldehyde, potassium dichromate, osmium tetroxide, and potassium permanganate), and the like.

The content of the crosslinking agent is not particularly limited, and may be included, for example, in an amount of about 1 to about 30 parts by weight, or specifically about 5 to about 20 parts by weight, based on about 100 parts by weight of the hard coating composition, but is not necessarily limited thereto.

In certain embodiments, the hard coating composition may further comprise a thermosetting agent.

The thermosetting agent may include an amine-based, imidazole-based, acid anhydride-based, amide-based thermosetting agent, and the like, and in terms of preventing discoloration and implementing high hardness, an acid anhydride-based thermosetting agent may be used, and these may be used alone or in combination of two or more, but the agent is not necessarily limited thereto.

In certain embodiments of the methods of manufacturing a glass substrate multilayer structure 100, the hard coating composition may be prepared by diluting the solid content through a solvent. In this case, the solvent may be any one selected from an alcohol-based solvent such as methanol, ethanol, isopropanol, butanol, methyl cellulose, or ethyl cellulose; a ketone-based solvent such as methyl ethyl ketone, methyl butyl ketone, methyl isobutyl ketone, diethyl ketone, dipropyl ketone, and cyclohexanone; a hexane-based solvent such as hexane, heptane, and octane; a benzene-based solvent such as benzene, toluene, and xylene; and the like, or a combination of two or more thereof, but this is only a non-limiting example, and is not necessarily limited thereto.

In certain embodiments of the methods of manufacturing a glass substrate multilayer structure 100, the hard coating composition may further comprise inorganic particles, in which the inorganic particles may be any one selected from silica, metal oxide, and the like, or a combination of two or more thereof, but is not necessarily limited thereto.

In addition, the inorganic particles may further comprise particles hydroxides such as aluminum hydroxide, magnesium hydroxide, potassium hydroxide; metal particles such as gold, silver, copper, nickel, and alloys thereof; conductive particles such as carbon, carbon nanotubes, and fullerenes; glass; ceramic; or the like, but is not necessarily limited thereto.

In certain embodiments, the inorganic particles may have an average particle diameter of about 1 to about 200 nm, specifically about 10 to about 200 nm, and within the average particle diameter range, inorganic particles having two or more different average particle diameters may be used, but the particles are not necessarily limited thereto. By including the inorganic particles as described above, the surface hardness of the hard coating layer 30 may be further improved.

In certain embodiments of the methods of manufacturing a glass substrate multilayer structure 100, the hard coating composition may further comprise a lubricant. The lubricant may further improve winding efficiency, blocking resistance, abrasion resistance, scratch resistance, and the like. Specific examples of the lubricant may include waxes such as polyethylene wax, paraffin wax, synthetic wax, or montan wax; synthetic resins such as a silicone-based resin and a fluorine-containing resin, and the like, and these may be used alone or in a combination of two or more thereof, but lubricant is not necessarily limited thereto.

Hereinafter, methods of forming the hard coating layer 30 will be described.

In certain embodiments of the method of manufacturing a glass substrate multilayer structure 100, the hard coating layer 30 is manufactured by applying and curing the hard coating composition on the opposite side of the surface on which the anti-scattering layer 20 is formed. In this case, the applying method may be various methods such as any one selected from bar coating, dip coating, die coating, gravure coating, comma coating, and slit coating or a mixing method thereof, but is not necessarily limited thereto.

In certain embodiments of the methods of manufacturing a glass substrate multilayer structure 100, the method of performing curing may comprises a method of performing photocuring or thermosetting alone, a method of performing thermosetting after photocuring, a method of performing photocuring after thermosetting, or the like, but is not necessarily limited thereto.

In addition, in certain embodiments, it may further comprise a process of processing pre-treatment by heating the composition for forming the hard coating layer before the photocuring, in which the pre-treatment may be performed at a lower temperature than the thermosetting, but is not necessarily limited thereto.

Hereinafter, the present embodiments will be described in more detail based on Examples and Comparative Examples. However, the following Inventive Examples and Comparative Examples are only examples for describing the present embodiments in more detail, and the present embodiments are not limited by Inventive Examples and Comparative Examples.

[Method of Measuring Physical Property]

1) Surface Hardness

Based on ASTM D3363, the pencil hardness of the glass substrate multilayer structures prepared in Examples and Comparative Examples was measured using a pencil by hardness (Mitsubishi) at a load of 750 gf using a pencil hardness tester (Gibei E&T). In this case, the surface of the glass substrate multilayer structure was measured with respect to the surface in the direction in which the hard coating layer was formed.

2) Impact Resistance (Pen Drop)

After a BIC Orange 0.7 mm pen was vertically placed over a glass substrate multilayer structure sample prepared in the following Examples and Comparative Examples and dropped from a designated position (height), the state of the glass substrate multilayer structure was evaluated according to the following criteria. In this case, the drop direction was measured with respect to the surface in the direction in which the hard coating layer was formed.

<Evaluation Criteria>

◎: No denting and pressing
o: There is denting and pressing
X: Broken

3) Bending

The glass substrate multilayer structure prepared in the following Examples and Comparative Examples was placed on a flat surface and the degree of bending of the glass substrate multilayer structure in the upward or downward direction was measured, and the case where the edge portion of the glass substrate is bent upward was represented by a + value, and the case where the bending or rolling occurs downward was represented by a − value.

Specifically, after applying and curing each composition for forming an anti-scattering layer and a hard coating layer on a glass substrate having width of 180 mm×length of 76 mm×thickness of 40 μm, a glass substrate multilayer structure was placed on a vibration isolation table that was accurately leveled, and then, the bending of the glass substrate multilayer structure was measured at room temperature. In this case, when the substrate is bent in the direction of the vibration isolation table and the center of the glass substrate is bent to the air layer, the step difference from the uppermost bent point of the center based on the edge was measured and represented by a negative (stress) value (mm), and conversely, when both ends of the glass substrate are bent in the direction of the air layer on the vibration isolation table, a step difference of the raised edge was measured based on the center and represented by a positive (tensile) value (mm).

4) Yellowness (YI)

The yellowness index for each sample was measured using a spectrophotometer (Nippon Denshoku, COH-5500) based on ASTM E313 standard.

5) Light Transmittance

Based on the ASTM D1746 standard, a spectrophotometer (Nippon Denshoku, COH-400) for a 50 μm thick film was used to measure the total light transmittance measured in the entire wavelength region of 400 to 700 nm. The unit is %.

6) Retardation ($R_{th}$)

The retardation was measured using Axoscan. The film was cut to a certain size using Axoscan to measure the thickness of the film, and then in order to compensate for the retardation value by measuring the retardation with Axoscan, the thickness (nm) measured while correcting in the C-plate direction was input.

$$R_{th}=[(n_x+n_y)/2-n_z]\times d$$ [Equation 1]

(In Equation 1, $n_x$ denotes the largest refractive index among in-plane refractive indices, $n_y$ denotes a refractive index perpendicular to $n_x$ among in-plane refractive indices, $n_z$ denotes a perpendicular refractive index, and d is calculated by converting the thickness of the glass substrate multilayer structure into 10 μm, i.e., using 10 μm as the unit.)

Preparation of Anti-scattering Composition

Preparation Example 1

After filling 230 g of N,N-dimethylpropionamide (DMPA) in a stirrer through which a nitrogen stream flows, 41 g of 2,2'-bis(trifluoromethyl)-4,4'-diaminodiphenyl ether (6FODA) was dissolved in a state in which the temperature of the reactor was maintained at 25° C. 50 g of ethylene glycol bis-anhydro trimellitate (TMEG100) was added thereto at the same temperature and dissolved while stirring for a certain period of time to prepare a polyimide precursor solution including a polyimide precursor. A solution obtained by diluting dipentaerythritol hexaacrylate in an N,N-dimethylpropionamide (DMPA) solvent so that the concentration of the solid content is 50 parts by weight was added to the polyimide precursor solution at 25° C., and stirred for a certain period of time. In this case, the dipentaeritritol hexaacrylate was included in an amount of 30 parts by weight based on 100 parts by weight of the total of the polyimide precursor and dipentaerythritol hexaacrylate. Then, dimethylpropionamide (DMPA) was added so that the concentration of the solid content was 20 parts by weight to prepare an anti-scattering composition.

Preparation Example 2

An anti-scattering composition was prepared in the same manner as in the Preparation Example 1, except that dipentaerythritol hexaacrylate was included in an amount of 20 parts by weight based on 100 parts by weight of the total of the polyimide precursor and the dipentaerythritol hexaacrylate.

Preparation Example 3

An anti-scattering composition was prepared in the same manner as in the Preparation Example 1, except that pentaerythritol tetraacrylate instead of dipentaerythritol hexaacrylate was included in an amount of 30 parts by weight based on 100 parts by weight of the total of the polyimide precursor and the pentaerythritol tetraacrylate.

Preparation Example 4

An anti-scattering composition was prepared in the same manner as in the Preparation Example 1, except that urethane acrylate (PU9020, Miwon Special Chemical) instead of dipentaerythritol hexaacrylate was included in an amount of 30 parts by weight based on 100 parts by weight of the total of the polyimide precursor and the urethane acrylate.

Preparation Example 5

An anti-scattering composition was prepared in the same manner as in the Preparation Example 1, except that polyester acrylate instead of dipentaerythritol hexaacrylate (PS2500, Miwon Special Chemical) was included in an amount of 30 parts by weight based on 100 parts by weight of the total of the polyimide precursor and the polyester acrylate.

Comparative Preparation Example 1

After filling 230 g of N,N-dimethylpropionamide (DMPA) in a stirrer through which a nitrogen stream flows, 41 g of 2,2'-bis(trifluoromethyl)-4,4'-diaminodiphenyl ether (6FODA) was dissolved in a state in which the temperature of the reactor was maintained at 25° C. 50 g of ethylene glycol bis-anhydro trimellitate (TMEG100) was added thereto at the same temperature and dissolved while stirring for a certain period of time to prepare a polyimide precursor solution including a polyimide precursor. Then, dimethylpropionamide (DMPA) was added so that the concentration of the solid content is 20 parts by weight to prepare an anti-scattering composition.

Preparation of Hard Coating Composition

Preparation Example 6

A composition for forming an acrylic hard coating layer was prepared by diluting 91 g of pentaerythritol triacrylate (PETA) and 3 g of first silica fine particles having a particle size of 15 nm (surface treatment 3-methacryloyloxy propylmethyldimethoxysilane), and a solid content of 1.95 g of photoinitiator (Irgacure 184, Ciba) in a methyl ethyl ketone (MEK) solvent so that the concentration of the solid content was 35 parts by weight.

Preparation of Glass Substrate Multilayer Structure

Example 1

An anti-scattering composition prepared in Preparation Example 1 was applied to one surface of a glass substrate (UTG 40 μm) with a #20 mayer bar, dried precursor films were imidized in a convection oven under a dry N2 gas flow at 80° C. for 15 min and 230° C. for 20 min, to thereby form an anti-scattering layer having a thickness of 5 μm. Then, the uncoated other surface of the glass substrate was coated with the hard coating composition prepared in Preparation Example 6 with a #10 bar, dried at 65° C. for 3 minutes, and then, irradiated with UV light of 300 mJ/cm², to thereby prepare a glass substrate multilayer structure formed with a hard coating having a thickness of 5 μm.

Example 2

A glass substrate multilayer structure was prepared in the same manner as in Example 1, except that the thickness of the anti-scattering layer was 8 μm.

Example 3 a glass substrate multilayer structure was prepared in the same manner as in Example 1, except that the thickness of the anti-scattering layer was 2 μm.

Example 4

The glass substrate multilayer structure was manufactured in the same manner as in Example 1, except that the anti-scattering layer was formed by using the anti-scattering composition prepared in Preparation Example 2 instead of the anti-scattering composition prepared in Preparation Example 1.

Example 5

The glass substrate multilayer structure was manufactured in the same manner as in Example 1, except that the anti-scattering layer was formed by using the anti-scattering composition prepared in Preparation Example 3 instead of the anti-scattering composition prepared in Preparation Example 1.

Example 6

The glass substrate multilayer structure was manufactured in the same manner as in Example 1, except that the anti-scattering layer was formed by using the anti-scattering composition prepared in Preparation Example 4 instead of the anti-scattering composition prepared in Preparation Example 1.

Example 7

The glass substrate multilayer structure was manufactured in the same manner as in Example 1, except that the anti-scattering layer was formed by using the anti-scattering composition prepared in Preparation Example 5 instead of the anti-scattering composition prepared in Preparation Example 1.

Comparative Example 1

The glass substrate multilayer structure was manufactured in the same manner as in Example 1, except that the anti-scattering layer was formed by using the anti-scattering composition prepared in Comparative Preparation Example 1 instead of the anti-scattering composition prepared in Preparation Example 1.

The physical properties of the glass substrate multilayer structures prepared in Examples 1 to 7 and Comparative Example 1 were measured, and are shown in Table 1 below.

TABLE 1

| | | | Anti-scattering layer | Hard coating layer | Surface | Impact Resistance (result/height) | Bend (mm) | Yellowness (YI) | Light transmittance (%) | Retardation ($R_{th}$) |
|---|---|---|---|---|---|---|---|---|---|---|
| Ex. | 1 | Thickness (μm) | 5 | 5 | 6H | ◎/15 cm | 0.1 | 1.54 | 91.2 | 16 |
| | | Composition | Prep. Ex. 1 | Prep. Ex. 6 | | | | | | |
| | 2 | Thickness (μm) | 8 | 5 | 6H | ◎/20 cm | 0.3 | 1.45 | 92.8 | 34 |
| | | Composition | Prep. Ex. 1 | Prep. Ex. 6 | | | | | | |
| | 3 | Thickness (μm) | 2 | 5 | 5H | ◎/20 cm | 0.15 | 1.31 | 91.3 | 24 |
| | | Composition | Prep. Ex. 1 | Prep. Ex. 6 | | | | | | |
| | 4 | Thickness (μm) | 5 | 5 | 5H | ◎/20 cm | 0.2 | 1.28 | 92.1 | 36 |
| | | Composition | Prep. Ex. 2 | Prep. Ex. 6 | | | | | | |
| | 5 | Thickness (μm) | 5 | 5 | 6H | ◎/20 cm | 0.21 | 1.34 | 91.5 | 35 |
| | | Composition | Prep. Ex. 3 | Prep. Ex. 6 | | | | | | |
| | 6 | Thickness (μm) | 5 | 5 | 6H | ◎/20 cm | 0.17 | 1.45 | 92.4 | 25 |
| | | Composition | Prep. Ex. 4 | Prep. Ex. 6 | | | | | | |
| | 7 | Thickness (μm) | 5 | 5 | 5H | ◎/20 cm | 0.19 | 1.45 | 92.4 | 25 |
| | | Composition | Prep. Ex. 5 | Prep. Ex. 6 | | | | | | |
| Com-Ex. | 1 | Thickness (μm) | 5 | 5 | 4H | X/15 cm | 0.05 | 1.4 | 92.4 | 26 |
| | | Composition | Com-prep. Ex. 1 | Prep. Ex. 6 | | | | 1.5 | 93.0 | 5- |

(Ex.: Example; Com-Ex.: Comparative Example; Prep. Ex.: Preparation example; Com-prep. Ex.: Comparative preparation example)

Referring to Table 1, the glass substrate multilayer structures of Examples 1 to 7 including the anti-scattering layer including the (meth)acrylic crosslinked polymer and the polyimide polymer have excellent surface hardness of 5 H or more, and as a result of the pen drop test, it can be confirmed that the multilayer structure has very good surface properties because no dents or press marks are generated even if the pen is dropped from a height of 15 cm or more (e.g., 20 cm).

In addition, it can be confirmed that the glass substrate multilayer structure have bending properties of 0.1 mm or less, or 0.2 mm or less, or 0.3 mm or less in all examples, and is suitable for use as a flexible glass substrate multilayer structure.

On the other hand, the glass substrate multilayer structure of Comparative Example 1 including an anti-scattering layer that did not including a (meth) acrylic crosslinked polymer had a lower surface hardness than Examples 1 to 7, and as the result of the pen drop test, it was seen that when the pen was dropped from 15 cm, the glass substrate multilayer structure was easily broken. In addition, it was confirmed that it had remarkably low surface properties and low bending properties of less than 0.05 mm.

In addition, it was confirmed that the glass substrate multilayer structures of Examples 1 to 7 had very good optical properties such as yellowness (YI), light transmittance, and retardation ($R_{th}$).

Therefore, according to an embodiment provided herein, the glass substrate multilayer structure having the anti-scattering layer including the polyfunctional (meth) acrylic crosslinked polymer and the polyimide polymer does not show the decrease in surface hardness or the pressing phenomenon, and may provide for the safety of users by remarkably improving impact resistance, and have excellent optical properties.

Hereinabove, a glass substrate multilayer structure, a manufacturing method thereof, and a flexible display panel comprising the same have been described through specific matters and limited examples, but these have been provided only for assisting in the entire understanding of the present disclosure. Therefore, the present disclosure is not limited to the exemplary embodiments. Various modifications and changes may be made by those skilled in the art to which the present disclosure pertains from this description.

According to one aspect, provided herein is a glass substrate multilayer structure that does not decrease surface hardness and does not generate marks during pressing or pen drop even when comprising a soft polymer.

According to another aspect, provided herein is a glass substrate multilayer structure that addresses a problem of decreasing surface hardness or producing marks or other defects when pressed, and a problem of generating marks during pen drop, has remarkably improved impact resistance, can provide for safety of a user by reducing a scattering when a glass substrate is broken, and has excellent optical properties even if the glass substrate multilayer structure comprises a structure including an anti-scattering layer formed on one surface of the glass substrate and a hard coating layer formed on the other surface opposite to the one surface.

In addition, according to an aspect, provided herein is a glass substrate multilayer structure having excellent surface properties that do not generate pen marks on a surface of a glass substrate or a surface of a hard coating layer when a pen drop test is performed at a designated position (height) even if the glass substrate multilayer structure has a structure including an anti-scattering layer formed on one surface of a glass substrate and a hard coating layer formed on the other surface opposite to the one surface.

In addition, according to an aspect, provided herein is a glass substrate multilayer structure that has excellent durability and scattering resistance and has flexible properties of folding or bending, does not cause breakage or cracks of glass even when a folding or bending operation is repeated, and thus, is usable in a flexible display device including smartphones, tablets and other portable devices.

In addition, according to an aspect, provided herein is a glass substrate multilayer structure that has excellent optical properties such as yellowness (YI), light transmittance, and thickness direction retardation $R_{th}$, and has remarkably improved visibility and transparency, and thus, is usable in a flexible display device.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A glass substrate multilayer structure, comprising:
   a flexible glass substrate;
   an anti-scattering layer comprising a soft polymer formed on one surface of the flexible glass substrate; and
   a hard coating layer formed on the other surface of the flexible glass substrate,
   wherein the anti-scattering layer comprises a (meth) acrylic crosslinked polymer and a polyimide polymer, and wherein the (meth)acrylic crosslinked polymer and the polyimide polymer are not covalently bonded to each other.

2. The glass substrate multilayer structure of claim 1, wherein the (meth) acrylic crosslinked polymer includes an alkylene group, an ether group, a urethane group, an ester group, or a combination thereof.

3. The glass substrate multilayer structure of claim 1, wherein the (meth) acrylic crosslinked polymer comprises a structural unit derived from a (meth) acrylic compound having 3 to 6 (meth)acrylic groups.

4. The glass substrate multilayer structure of claim 3, wherein the (meth)acrylic compound comprises trimethylolpropane tri(meth)acrylate, trimethylolethane tri(meth)acrylate, 1,2,4-cyclohexanetri (meth) acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra (meth)acrylate, dipentaerythritol hexa (meth)acrylate, tripentaerythritol tri(meth)acrylate, tripentaerythritol hexa (meth)acrylate, polyfunctional urethane (meth)acrylate, polyfunctional polyester(meth)acrylate, or a combination thereof.

5. The glass substrate multilayer structure of claim 1, wherein the polyimide polymer comprises a unit derived from a fluorine-containing aromatic diamine and a unit derived from an aromatic dianhydride.

6. The glass substrate multilayer structure of claim 1, wherein the hard coating layer comprises a (meth) acrylic hard coating layer.

7. The glass substrate multilayer structure of claim 1, wherein the flexible glass substrate has a thickness of 1 to 100 μm.

8. The glass substrate multilayer structure of claim 1, wherein the anti-scattering layer has a thickness of 1 to 20 μm.

9. The glass substrate multilayer structure of claim 1, wherein the hard coating layer has a thickness of about 1 to about 15 μm.

10. The glass substrate multilayer structure of claim 1, wherein the glass substrate multilayer structure has a pencil hardness of about 4H to about 9H according to ASTM D3363.

11. The glass substrate multilayer structure of claim 1, wherein the glass substrate multilayer structure has an impact resistance of about 10 cm or more in a pen drop test.

12. A flexible display panel comprising the glass substrate multilayer structure of claim 1.

13. A method of manufacturing a glass substrate multilayer structure, comprising:
   applying a composition comprising a polyimide precursor and a (meth)acrylic compound on one surface of a flexible glass substrate;
   curing the composition comprising the polyimide precursor and the (meth)acrylic compound to form an anti-scattering layer comprising a soft polymer, wherein the anti-scattering layer comprises a (meth)acrylic crosslinked polymer and a polyimide polymer, and wherein the (meth)acrylic crosslinked polymer and the polyimide polymer are not covalently bonded to each other;
   applying a hard coating composition on the other surface of the flexible glass substrate; and
   curing the hard coating composition to form a hard coating layer.

14. The method of claim 13, wherein the (meth)acrylic compound further includes an alkylene group, an ether group, a urethane group, an ester group, or a combination thereof.

15. The method of claim 13, wherein the (meth) acrylic compound comprises 3 to 6 (meth)acrylic groups.

16. The method of claim 13, wherein the (meth)acrylic compound comprises trimethylolpropane tri(meth)acrylate, trimethylolethane tri(meth)acrylate, 1,2,4-cyclohexanetri (meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta (meth)acrylate, dipentaerythritol tetra (meth)acrylate, dipentaerythritol hexa(meth)acrylate, tripentaerythritol tri(meth)acrylate, tripentaerythritol hexa (meth)acrylate, polyfunctional urethane (meth)acrylate, polyfunctional polyester(meth)acrylate, or a combination thereof.

17. The method of claim 13, wherein the polyimide precursor comprises a unit derived from a fluorine-containing aromatic diamine and a unit derived from an aromatic dianhydride.

18. The method of claim 13, wherein the hard coating composition comprises a (meth) acrylic compound.

* * * * *